United States Patent
Hunt

(10) Patent No.: US 8,526,328 B2
(45) Date of Patent: Sep. 3, 2013

(54) POINTING, ACQUISITION AND TRACKING IN A NETWORKED COMMUNICATIONS SYSTEM

(75) Inventor: Jeffrey H. Hunt, Thousand Oaks, CA (US)

(73) Assignee: The Boeing Company, Chicago, IL (US)

(*) Notice: Subject to any disclaimer, the term of this patent is extended or adjusted under 35 U.S.C. 154(b) by 846 days.

(21) Appl. No.: 12/607,227

(22) Filed: Oct. 28, 2009

(65) Prior Publication Data

US 2011/0096696 A1 Apr. 28, 2011

(51) Int. Cl.
H04L 12/28 (2006.01)

(52) U.S. Cl.
USPC ............... 370/254; 370/252; 370/315

(58) Field of Classification Search
USPC ............ 370/254, 401; 398/118, 158
See application file for complete search history.

(56) References Cited

U.S. PATENT DOCUMENTS

| | | | |
|---|---|---|---|
| 6,297,897 B1* | 10/2001 | Czichy et al. | 398/122 |
| 6,816,112 B1 | 11/2004 | Chethik | |
| 6,956,816 B1* | 10/2005 | Alexander et al. | 370/222 |
| 7,379,673 B2* | 5/2008 | Krill et al. | 398/118 |
| 7,532,997 B2* | 5/2009 | Li et al. | 702/150 |
| 2003/0067657 A1 | 4/2003 | Dimmler et al. | |
| 2007/0230643 A1* | 10/2007 | Beadle et al. | 375/350 |
| 2007/0253323 A1* | 11/2007 | Dapper et al. | 370/208 |
| 2007/0297808 A1* | 12/2007 | Pavelchek | 398/158 |
| 2008/0298770 A1* | 12/2008 | Noguchi | 386/95 |
| 2010/0039316 A1* | 2/2010 | Gronemeyer et al. | 342/357.06 |
| 2011/0281571 A1* | 11/2011 | Patel et al. | 455/418 |
| 2012/0068880 A1* | 3/2012 | Kullstam et al. | 342/54 |

FOREIGN PATENT DOCUMENTS

EP 0 289 306 A2 11/1988

OTHER PUBLICATIONS

Kawase, K. et al. "Difference-frequency terahertz-wave generation from 4-dimethylamino-N-methyl-4-stilbazolium-tosylate by use of an electronically tuned Ti:sapphire laser." Optics Letters, vol. 24, No. 15, pp. 1065-1067, Aug. 1, 1999.

Shi, W. et al. "Efficient, tunable, and coherent 0.18-5.27-THz source based on GaSe crystal." Optics Letters, vol. 27, No. 16, pp. 1454-1456, Aug. 15, 2002.

Tanabe, T. et al. "Tunable terahertz wave generation in the 3—to 7-THz region from GaP." Applied Physics Letters, vol. 83, No. 2, pp. 237-239, Jul. 14, 2003.

(Continued)

*Primary Examiner* — Hassan Kizou
*Assistant Examiner* — Emmanuel Maglo
(74) *Attorney, Agent, or Firm* — Charles L. Moore; Moore & Van Allen PLLC

(57) ABSTRACT

A system for pointing, acquisition, and tracking in a networked communications system is disclosed. A first communications device of the networked communications system may include a PAT module for establishing PAT links with other communications elements in the networked communications system. A second communications device may also include a PAT module for establishing PAT links with other communications elements in the networked communications system. A communications node may also include a PAT module for establishing PAT links with other communications elements in the networked communications system. A first PAT link is formable between the first communications device and the communications node. A second PAT link is formable between the second communications device and the communications node, and a third PAT link is formable between the first communications device and the second communications device through the communications node.

20 Claims, 2 Drawing Sheets

(56) References Cited

OTHER PUBLICATIONS

Taniuchi, T. et al. "Widely tunable terahertz-wave generation in an organic crystal and its spectroscopic application." Journal of Applied Physics, vol. 95, No. 11, pp. 5984-5988, Jun. 1, 2004.

UK Intellectual Property Office, Combined Search and Examination Report dated Feb. 22, 2011 for Application No. GB1017939.8.

Baister, G., , et al. "The SOUT optical intersatellite communication terminal," Optoelectronics, IEE Proceedings, vol. 141, No. 6, pp. 345-355 (Dec. 1994).

Garcia-Talavera, Marcos Reyes, et al., "Ground to space optical communication characterization," Proc. SPIE, vol. 5892; pp. 589202-1 to 589202-16.

Tolker-Nielsen, Toni, et al., "In Orbit test result of an Operational Optical Intersattellite Link between ARTEMIS and SPOT4, SILEX," Proc. of SPIE, vol. 4635, pp. 1-15, (Apr. 26, 2002).

\* cited by examiner

POINTING, ACQUISITION AND TRACKING IN A NETWORKED COMMUNICATIONS SYSTEM

FIELD

The present disclosure relates to communications and communications systems, and more particularly to a system and method for pointing, acquisition, and tracking in a networked communications system.

BACKGROUND

Heritage communications systems used throughout the aerospace and defense communities are based on point to point communications architectures. If broader geographic communications is needed, antennas are used which broadcast into larger hemispheres of the geographical space. However, in this situation, there is a strong connection between range and data bandwidth, the latter rapidly dropping with increased range. Additionally, point to point platforms, typically used today, only allow pairs of users to be in communication or in so-called informational contact. This is partly due to the use of omni-directional communications systems, usually operating in the radio regime, broadcasting into large volumes. The use of such systems, while simple, cannot transmit at very high data rates over very long distances. This is because the signal strength falls off too quickly. Newer digital formats are allowing for higher bandwidth communications, but these systems require accurate pointing, acquisition and tracking (PAT) to make sure that the radio frequency (RF) energy, and consequently, informational content, are pushed to the correct user. The use of optical systems has inherently higher data rates, due to their higher carrier frequencies. But those frequencies, even more than radio or microwave, must track one another to maintain informational contact.

SUMMARY

In accordance with an embodiment, a system for pointing, acquisition, and tracking in a networked communications system may include a plurality of communications elements. The plurality of communication elements may include a first communications device, a second communications device and a communications node. The first communications device may include a PAT module for establishing PAT links with other communications elements in the networked communications system. The second communications device may also include a PAT module for establishing PAT links with other communications elements in the networked communications system. The communications node may also include a PAT module for establishing PAT links with other communications elements in the networked communications system. A first PAT link is formable between the first communications device and the communications node. A second PAT link is formable between the second communications device and the communications node, and a third PAT link is formable between the first communications device and the second communications device through the communications node.

In accordance with another embodiment, a communications node for a networked communications system may include a PAT module for establishing a separate PAT link with each communications device of at least one pair of communications devices. The communications node may also include a PAT through link module to establish a PAT link through the communications node between the communications devices of the at least one pair of communications devices.

In accordance with another embodiment, a method for pointing, acquisition, and tracking in a networked communications system may include establishing a first PAT link between a first communications device and a communications node. The method may also include establishing a second PAT link between a second communications device and the communications node. The method may further include establishing a third PAT link between the first communication device and the second communications device, wherein the third PAT link is established through the communications node.

In accordance with another embodiment, a computer program product for pointing, acquisition, and tracking in a networked communications system may include a computer readable storage medium having computer readable program code embodied therewith. The computer readable program code may include computer readable program code configured to establish a first PAT link between a first communications device and a communications node. The computer readable program code may also include computer readable program code configured to establish a second PAT link between a second communications device and the communications node. The computer readable program code may further include computer readable program code configured to establish a third PAT link between the first communication device and the second communications device, wherein the third PAT link is established through the communications node.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

DESCRIPTION

Figure 1:
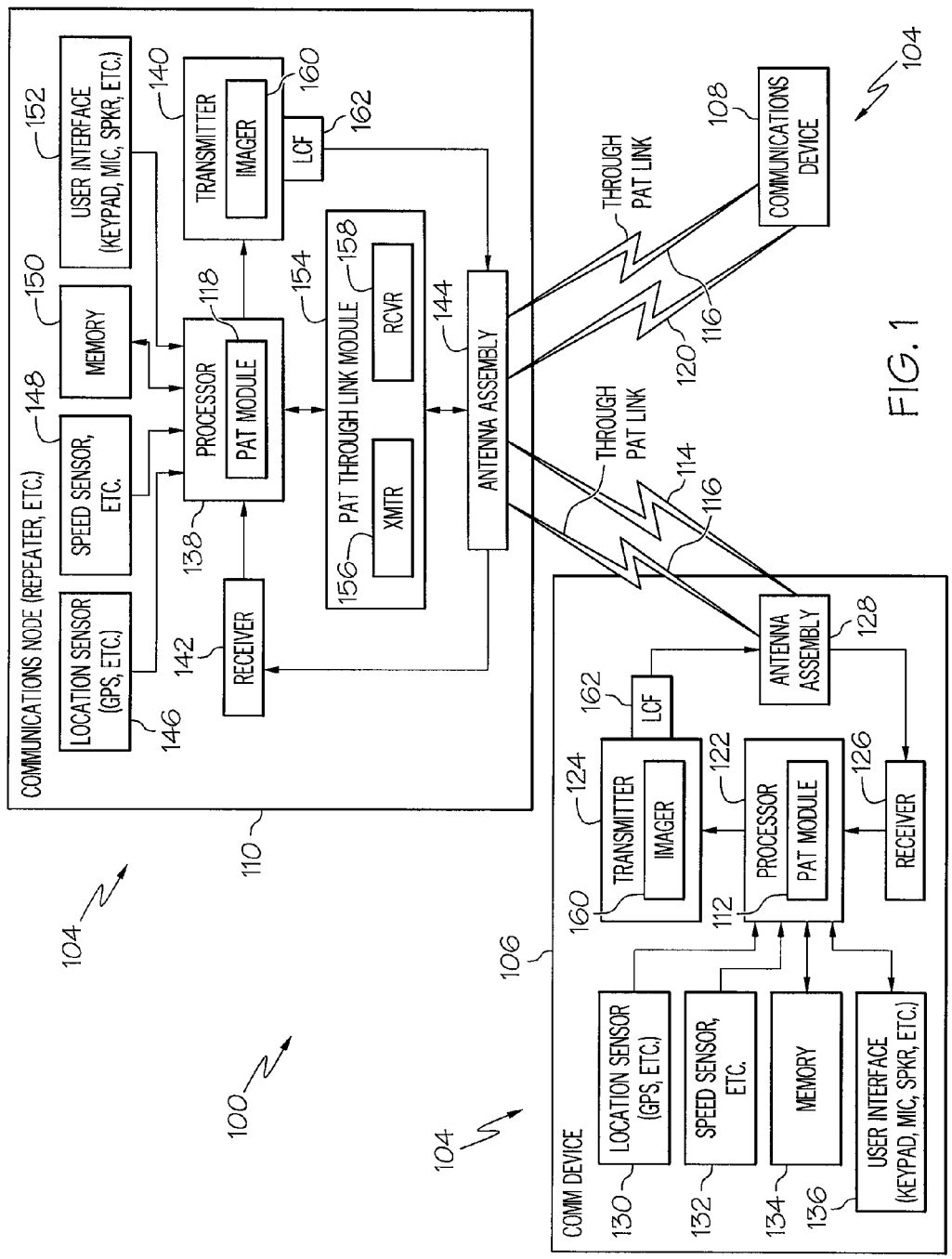
FIG. 1 is a block schematic diagram of an example of a networked communications system including an exemplary system for pointing, acquisition, and tracking communications elements in the networked communications system in accordance with an embodiment of the present disclosure.

The following detailed description of embodiments refers to the accompanying drawings, which illustrate specific embodiments of the disclosure. Other embodiments having different structures and operations do not depart from the scope of the present disclosure.

As will be appreciated by one of skill in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block schematic diagram of an example of a networked communications system 100 including an exemplary system 102 for pointing, acquisition, and tracking communications elements 104 in the networked communications system 100 in accordance with an embodiment of the present disclosure. The networked communications system 100 may include a plurality of communications elements 104. A simple basic networked communications system 100 is illustrated in FIG. 1. The plurality of communications elements 104 in communications system 100 may include a first communications device 106, a second communications device 108, and a communication node 110. The first communications device 106 may include a pointing, acquisition, and tracking (PAT) module 112 for establishing PAT links 114 and 116 with other communications elements 104 in the networked communications system 100, such as communications node 110 and the second communications device 108. The second communications device 108 may be substantially similar to the first communications device 106 and may also include a PAT module (not shown in FIG. 1 for purposes of clarity) for establishing PAT links with other communications elements 104 in the networked communications system 100, such as communications node 110 and the first communications device 106.

The communications node 110 may also include a PAT module 118 for establishing PAT links with other communications elements 104, such as the first communications device 106 and the second communications device 108. Accordingly, a first PAT link 114 is formable between the first communications device 106 and the communications node 110. A second PAT link 120 is formable between the second communications device 108 and the communications node 110, and a third PAT link 116 is formable between the first communications device 106 and the second communications device 108 through the communications node 110.

The PAT module 112 of the first communications device 106 may be embodied in and operable on a processor 122. The first communications device 106 may also include a transmitter 124 and a receiver 126 for transmitting and receiving information over the first PAT link 114 and the third PAT link 116. The transmitter 124 and the receiver 116 may be coupled to an antenna assembly 126 for sending and receiving wireless or radio frequency (RF) communications or signals to and from the first communications device 106. The communications device 106 may also be adapted for transmitting and receiving communications in other bandwidth, such as the optical spectrum.

The first communications device 106 may also include a location sensor 130 to determine position information associated with the first communications device 106 relative to at least one other communications element 104, such as the communications node 110 or the second communications device 108. The at least one other communications element 104 (or communications node 110 or second communications device 108) may utilize the position information for pointing to the first communications device 106 for communications therewith. The location sensor 130 may be a global position system (GPS), inertial measurement unit (IMU), or any suitable device for determining a position or location of the first communications device 106.

The first communications device 106 may also include a speed sensor or velocity sensor 132 to determine velocity information associated with the first communications device 106.

The first communications device 106 or element 104 may also include a component, components or means for measuring time dependent position information of the communications device 106 or element 104 and for correlating the time dependent position information with a computationally derived position of the first communications device 106 to provide acquisition information associated with the first communications device 106. The means for measuring time dependent position information and correlating the time dependent position information may be embodied in the PAT module 112 or in another module operable on the processor 122.

A module or means for recording and stabilizing the position and acquisition information may also be embodied in the PAT module 112 or in another module or unit operable on the processor 122.

The first communications device 106 or communications element 104 may also include a memory 134 for storing tracking information for the first PAT link 114 and the third PAT link 116. The memory 134 may also store other information for establishing and maintaining the PAT links 114 and 116.

The first communications device 106 or communications element 104 may also include a user interface 136 to permit a user to control the first communications device 106 and to communicate with other communications elements 104 in the networked system 100. The user interface 136 may, for example, include a keypad or keyboard, microphone, speakers, function buttons and other devices for operating or controlling the first communications device 106.

The communications node 110 may include similar components to the first communications device 106. For example, the PAT module 118 may be embodied in and operable on a processor 138. The communications node 110 may also include a transmitter 140 and a receiver 142 coupled to an antenna assembly 144 for transmitting and receiving communications signals to and from other communications elements 104 in the networked system 100, such as first communications device 106 and the second communications device 108.

The communications node 110 may also include a location sensor 146, a speed sensor 148 a memory 150 and a user interface 152. These components may have similar functions as those described with respect to the same components in first communications device 106.

The communications node 110 may also include a PAT through link module 154. The PAT through link module 154 may provide a direct PAT connection for the third PAT link 116 between the first communications device 106 and the second communications device 108 through the communications node 110. The PAT through link module 154 may also include a transmitter 156 and a receiver 158 for coupling the third PAT link 116 through the communications node 110. The transmitter 156 and receiver 158 may be coupled to the antenna assembly 144.

The communications node 110 may also include a module or means for comparing internal reference data or PAT information of the communications node 110 with PAT information from other communications elements 104 to close an informational loop to provide tracking information. The module or means for comparing PAT information of the communications node 110 with PAT information from other communications elements 104 may be embodied in the PAT module 118 or the PAT through link module 154.

Accordingly, tracking information for the first PAT link 114 and the second PAT link 120 may be used to re-establish the third PAT link 116 in response to the third PAT link 116 being lost or losing communications for some reason, such as misalignment of the antennas on the communications elements 104 or for other reasons. Similarly, tracking information for the second PAT link 120 and the third PAT link 116 may be used to re-establish the first PAT link 114 in response to the first PAT link 114 being lost or going down for some reason. Further, tracking information for the first PAT link 114 and the third PAT link 116 may be used to re-establish the second PAT link 120 in response to the second PAT link 120 being lost.

Each of the communications elements 104 (first and second communications devices 106 and 108 and communications node 110) may be respectively mounted to a ground based platform or vehicle, an error-based platform or vehicle, such as an aircraft, or a space based platform or vehicle, such as a satellite or spacecraft. Additionally, the exemplary system for PAT 102 is independent of the portion of the electromagnetic spectrum used by the communications elements.

The exemplary networked system 100 may also be expanded to include additional communications devices and communications nodes interconnected by PAT links similar to that described above.

For communications with high bandwidths, capable of supporting for example, an Internet link or the like, high signal to noise ratios are needed. The implication is that the propagated radiation or communications signal has to go in one focused area on the target (nominally called a "spot") and has to be controlled for proper operation. The target may be another communications element 104 in the networked communications system 100, such as communications devices 106 and 108, communications node 110 or some other communications element. To accomplish the focused area or spot and to control the positioning of the spot on the target, PAT is used with the communications system 100 for operation. As previously discussed, PAT stands for pointing, acquisition and tracking. Each of these terms has a specific meaning in free space applications. Whether PAT is being used at RF frequencies or in the optical domain or portion of the frequency spectrum, or any frequencies in between, the same PAT operations need to be performed. Pointing means that a transmitter associated with a communications element 104 has directed its electromagnetic radiation which may be light from a laser or some other electromagnetic radiation towards a receiver associated with another communications element 104 in the networked system 100. The transmitter, such as transmitter 124 or 140, may include an imager 160, locator, or similar apparatus to make sure that the propagated light is impinging on the receiver at the target, such as receiver 126 of communications device 106 or receiver 142 of communications node 110. This operation is completely passive and one-sided. The receiver does not detect that it is being illuminated.

Acquisition means that the target has now turned on their receiver, and has started to receive/detect the light that is coming from the transmitter of the other communications element 104. This does not imply that there is any information being transferred. Acquisition is also open loop, i.e., no information from the receiver of the target is sent back to the transmitter 124 of the other communications element 104 as to the success of the light reception.

Tracking implies that the receiver of the target is now able to broadcast back to the transmitter of the other device or element, letting the transmitter know that the light is being received, that information is being transferred on the light signal, and that information about the target position and trajectory are being send back to the transmitter to allow for closed loop operation. In other words, the transmitter of the other communications element now has information about how well it is sending the light and information to the target to make sure that it can maximize the energy and therefore information transfer associated with the light propagation.

There are a series of "light conditioning functions" 162 that are done to the propagated light or electromagnetic radiation by the communications devices 106 and 108 and the communications node 110. The light conditioning functions 162 may include frequency (wavelength) control, polarization control, bandwidth control, intensity control and the like. Frequency (wavelength) control of the light signal or radiation may include any number of frequency control components, such as a diffraction grating, interferometer, or other component to control the frequency or wavelength of the electromagnetic radiation or signal. Polarization control may include polarizing crystals, or thin film polarizer, but can also include wave plates, or other devices useful for changing polarization. Bandwidth control may utilize an etalon, frequency filter or other component to control the bandwidth of the propagated light or electromagnetic radiation. Intensity control may be done by aperturing the beam of light, reducing the amplification, or exploiting the polarization to control the intensity.

The receiving and transmitting hardware may also include a telescope for communications in the optical regime or parabola for communications in the radio frequency regime.

Once PAT and light conditioning all takes place, it is possible to share position and velocity information between communications devices 106 and 108 and node 110 and any other elements making up the networked communications system 100 or to close the informational loop to provide tracking information for maintaining the communications links. This information is important to successful maintenance of the PAT once it has been established.

Figure 2:
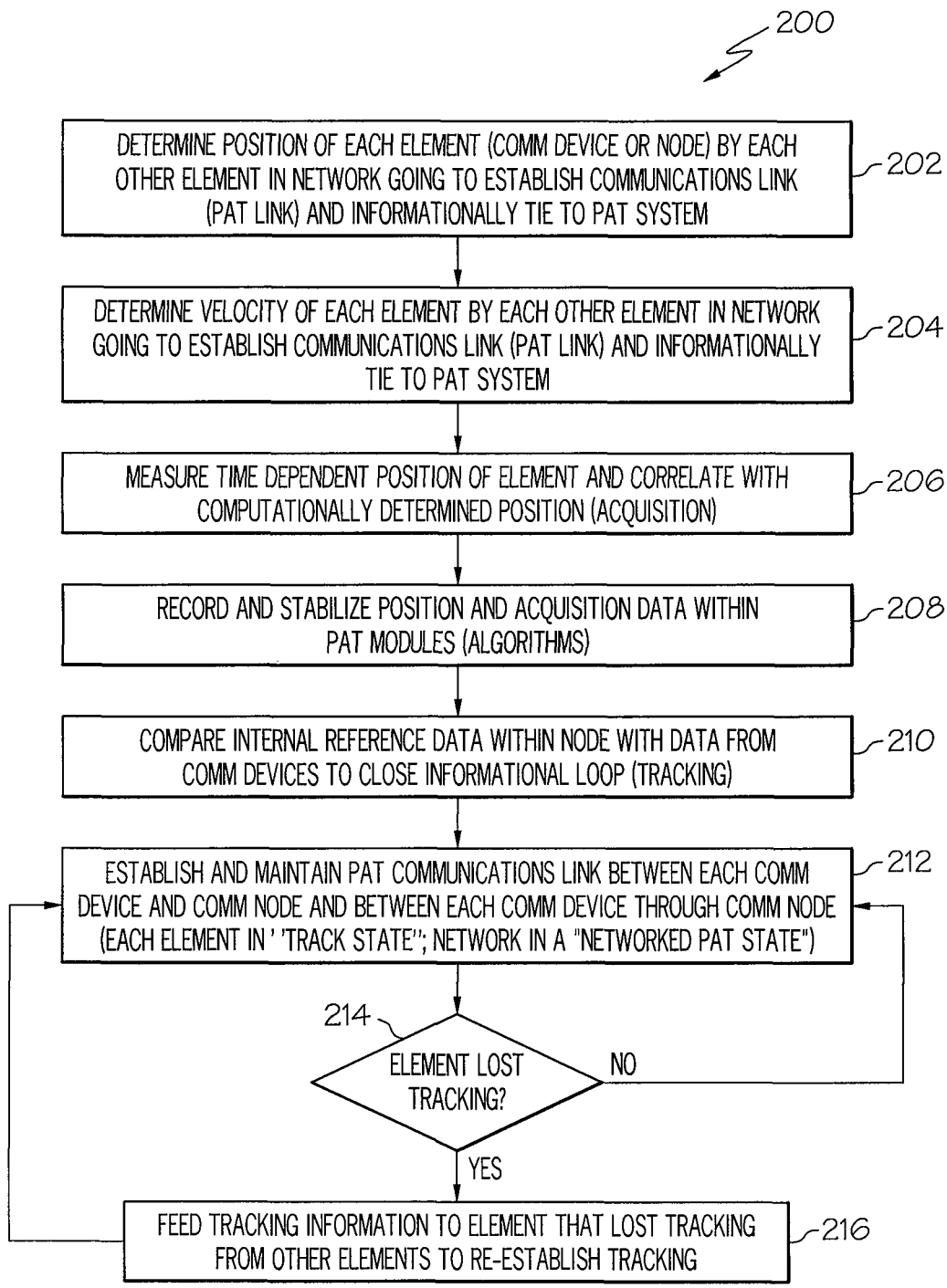
FIG. 2 is an example of a method for pointing, acquisition, and tracking communications elements in a networked communications system in accordance with an embodiment of the present disclosure.

FIG. 2 is an example of a method 200 for pointing, acquisition, and tracking communications elements in a networked communications system in accordance with an embodiment of the present disclosure. The method 200 may be embodied in the system 100 in FIG. 1 or may be performed by the communications elements 104 in FIG. 1. Each of the communications elements 104, such as communications devices 106 and 108 and the communications node 110 may perform the functions or operations in the method 200.

In block 202, a position of each element (communications device or communications node) may be determined by each other element in the communications network between which a PAT link is to be established. The position information may be informationally tied to the PAT system similar to that previously described. Just because a signal is being received, i.e., there is light going into the receiver's detector, does not necessarily imply that information or data is being transferred. Being "informationally tied" may be defined as meaning that the system is operating well enough that a PAT condition has been established, plus sufficient signal to noise, bandwidth and other operating parameters exist that useful, i.e. actionable information, may be transmitted. In other words, the position information may be used as further described herein to determine PAT information which may be maintained by one or more of the communications elements and may be used to re-establish a PAT link which has been lost or goes down for some reason.

In block 204, a velocity of each communications element may be determined by each other communications element in the communications network between which a PAT link is to be established and the velocity information may be informationally tied to the PAT system for use in establishing the PAT link and may be used to re-establish a PAT link which may be lost.

In block 206, a time dependent position of each communications element may be measured and correlated with computationally determined position of the communications element. This procedure may be referred to as acquisition.

In block 208, the position and acquisition information may be recorded or stored and stabilized for use in establishing the PAT link and for use in re-establishing any lost PAT link. The position and acquisition information may be recorded and stabilized within the PAT modules or algorithms, such as PAT modules 112 and 118 in FIG. 1. Modern trackers or tracking devices do not work exclusively on hardware induced signals. They include software that takes the temporal measurements and predicts where the target is moving. Devices, such as Kalman filters or similar apparatus, may be used to help in the calculation to determine where the target is moving. The position and acquisition information being stabilized may be defined to mean that the predicted track and the actual track are close enough to one another as to be actually useful.

In block 210, internal reference data within the communications node may be compared with the data from the communications devices to close an informational loop. Accordingly, the PAT loop has been closed and signals are being received that are determined to be good enough that the data can be used, both for maintaining the track and for communications. This process may also be referred to as tracking.

In block 212, a PAT communications link may be established and maintained between each communications device and the communications node and between each communications devise through the communications node. Each communications element (communications device or communications node) may be defined as being in a "track state" and the network may be defined as being in a "networked PAT state" when all PAT links are in operation. Accordingly, referring also to FIG. 1, the first PAT link 116 may be established between the first communications device 106 and the communications node 110. The second PAT link 120 may be established between the second communications device 108 and the communications node 110, and the third PAT link 116 may be established between the first communications device 106 and the second communications device 108, wherein the third PAT link 116 is established through the communications node 110.

In block 214, a determination may be made whether a communications element (communications devise or communications node) has lost tracking. If no communications elements have lost tracking the method 200 may return to block 212 and the PAT links may be maintained. If a communications element has lost tracking, the method 200 may advance to block 216. In block 216, tracking information or PAT information may be feed to the communications element that lost tracking from other communications elements to re-establish tracking and/or the PAT link.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A system for pointing, acquisition, and tracking (PAT) in a networked communications system, comprising:
   a plurality of communications elements, comprising:
   a first communications device comprising: a first processor and a first PAT module operating on the first processor for establishing PAT links with other communications elements in the networked communications system;
   a second communications device comprising: a second processor and a second PAT module operating on the second processor for establishing PAT links with other communications elements in the networked communications system; and
   a communications node comprising: a third processor and a third PAT module operating on the third processor for establishing PAT links with other communications elements in the networked communications system, wherein a first PAT link is formable between the first communications device and the communications node, a second PAT link is formable between the second communications device and the communications node, and a third PAT link is formable between the first communications device and the second communications device through the communications node, wherein the first PAT link and the second PAT link together define another communications link with respect to the third PAT link between the first communications device and the second communications device.

2. The system of claim 1, wherein the first communications device comprises:
   a transmitter and a receiver for transmitting and receiving information over the first PAT link and the third PAT link, the information comprising tracking information for maintaining and re-establishing communications in response to at least one of the first PAT link, second PAT link, or the third PAT link being lost; and
   a memory for storing the tracking information for the first PAT link and the third PAT link.

3. The system of claim 2, wherein the second communications device comprises:

a transmitter and a receiver for transmitting and receiving the information over the second PAT link and the third PAT link; and
a memory for storing the tracking information for the second PAT link and the third PAT link.

4. The system of claim 3, wherein the communications node comprises:
   a transmitter and a receiver for transmitting and receiving the information over the first PAT link and the third PAT link; and
   a memory for storing the tracking information for the first PAT link and the third PAT link.

5. The system of claim 4, wherein the tracking information for the first PAT link and the second PAT link is useable to re-establish the third PAT link in response to the third PAT link being lost, and wherein the tracking information for the second PAT link and the third PAT link is useable to re-establish the first PAT link in response to the first PAT link being lost, and wherein the tracking information for the first PAT link and the third PAT link are useable to re-establish the second PAT link in response to the second PAT link being lost.

6. The system of claim 1, wherein the communications node further comprises a PAT through link module for establishing and maintaining the third PAT link.

7. The system of claim 1, wherein each of the communications elements comprise:
   a location sensor to determine position information associated with the communications element relative to at least one other communications element and for the at least one other communications element to utilize the position information for pointing to the communications element for communications therewith;
   a velocity sensor to determine velocity information associated with the communications element;
   a first module operating on the processor associated with each communications element for measuring time dependent position information of the communications element and correlating the time dependent position information with a computationally derived position of the communications element to provide acquisition information associated with the communications element; and
   a second module operating on the processor associated with each communications element for recording and stabilizing the position and acquisition information.

8. The system of claim 7, wherein the communications node comprises means for comparing PAT information of a first communications element with PAT information from at least one other communications element to close an informational loop to provide tracking information.

9. The system of claim 1, wherein each of the plurality of communications elements is mountable to a ground based platform or vehicle, air based platform or vehicle, or space based platform or vehicle.

10. A communications node for a networked communications system, comprising:
    a processor;
    a pointing, acquisition, and tracking (PAT) module, operating on the processor, for establishing a separate PAT link with each communications device of at least one pair of communications devices; and
    a PAT through link module comprising a first transmitter and a first receiver, the PAT through link module being adapted to establish a separate PAT link through the communications node between the communications devices of the at least one pair of communications devices, wherein the separate PAT link between each at least one pair of communications devices together define another communications link with respect to the separate PAT link through the communications node to each at least one pair of communications devices.

11. The communications node of claim 10, further comprising:
a second transmitter and a second receiver for transmitting and receiving information over the separate PAT link between each at least one pair of communications devices, the information comprising tracking information for maintaining and re-establishing communications in response to one of the separate PAT links being lost; and
a memory for storing the tracking information for the first PAT link and the third PAT link.

12. A method for pointing, acquisition, and tracking (PAT) in a networked communications system, comprising:
establishing a first PAT link between a first communications device and a communications node;
establishing a second PAT link between a second communications device and the communications node;
establishing a third PAT link between the first communication device and the second communications device, wherein the third PAT link is established through the communications node, wherein the first PAT link and the second PAT link together define another communications link with respect to the third PAT link between the first communications device and the second communications device.

13. The method of claim 12, wherein the first communications device, the second communications device and the communications node define communications elements of the networked communications system, and wherein the method further comprises feeding tracking information to any one of the communications elements that losses tracking from the other communications elements to re-establish tracking by the one communications element that losses tracking.

14. The method of claim 13, further comprising determining a position of each communications element by each other communications element in the communications network between which one of the PAT links is to be established.

15. method of claim 14, further comprising determining a velocity of each communications element by each other communications element in the communication network between which one of the PAT links is to be established.

16. The method of claim 15, further comprising:
measuring a time dependent position of each communications element; and
correlating the measured time dependent position with a computationally determined position to provide acquisition.

17. The method of claim 16, further comprising: storing position and acquisition information; and
stabilizing the position and acquisition information for use in reestablishing any lost PAT link.

18. The method of claim 17, further comprising comparing in the communications node internal reference information to close an informational loop for tracking between the communications elements.

19. A computer program product for pointing, acquisition, and tracking (PAT) in a networked communications system, the computer program product comprising:
a non-transitory computer readable storage medium having computer readable program code embodied therewith, the computer readable program code comprising:
computer readable program code configured to establish a first PAT link between a first communications device and a communications node;
computer readable program code configured to establish a second PAT link between a second communications device and the communications node;
computer readable program code configured to establish a third PAT link between the first communication device and the second communications device, wherein the third PAT link is established through the communications node, wherein the first PAT link and the second PAT link together define another communications link with respect to the third PAT link between the first communications device and the third communications device.

20. The computer program product of claim 19, wherein the first communications device, the second communications device and the communications node define communications elements of the networked communications system, wherein the computer readable program code further comprises computer readable program code configured to feed tracking information to any one of the communications elements that losses tracking from the other communications elements to re-establish tracking by the one communications element that losses tracking.

* * * * *